Patented July 9, 1935

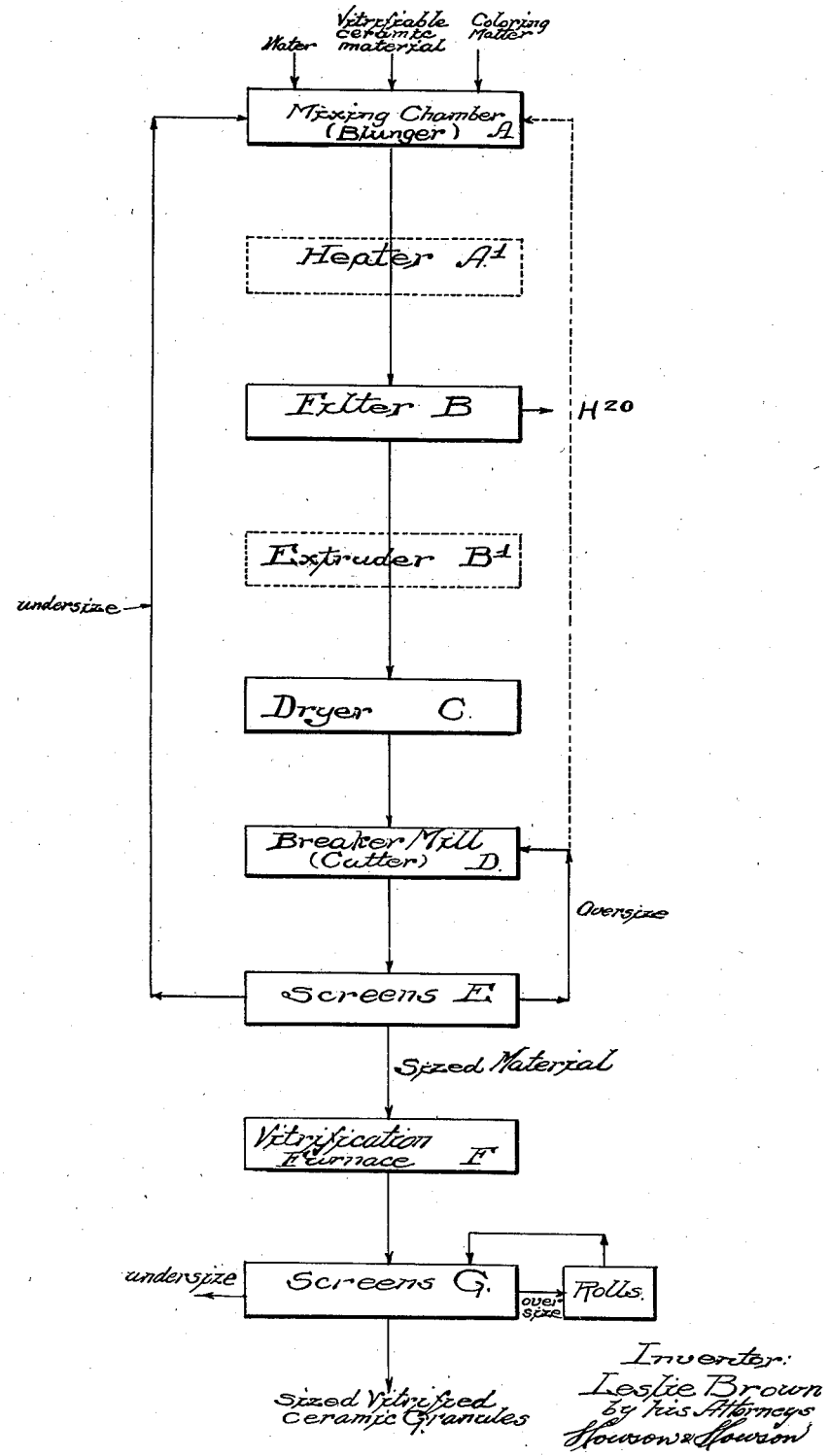

2,007,742

UNITED STATES PATENT OFFICE 2,007,742

PROCESS OF MAKING CERAMIC GRANULES

Leslie Brown, Trenton, N. J.

Application March 10, 1934, Serial No. 715,034

3 Claims. (Cl. 106—11)

My invention relates to a process of making ceramic granules, and more particularly it relates to a novel and economical process for the manufacture of white or colored vitrified ceramic granules of wide use and applicability in the industries.

One object of my invention is to provide a process for the manufacture of vitrified ceramic granules in which the waste of raw materials is reduced to a minimum by the re-utilization thereof in the process and by which uniform products both as to size and coloration may be repeatedly obtained.

A further object of the present invention is to provide a process by which vitrified ceramic granules characterized by little or no water absorption, and by high resistance to erosion and other weathering conditions may be easily and economically manufactured.

Still another object of the invention is to furnish a process for making dense vitrified ceramic granules, free from sharp edges and corners, and uniform in structure and coloration, not only on the surface thereof, but also throughout each individual granule.

Other objects will be apparent from a consideration of the specification and claims.

Heretofore, various types of unburned or unvitrified ceramic granules have been manufactured, but their use, particularly in architectural finishing, has been limited, due to their high absorptive qualities, their lack of strength and of resistance to weathering conditions, and their tendency to bloom and blister. By the process of the present invention, vitrified ceramic granules of desired coloration, as distinguished from non-vitrified granules, may be prepared economically, since the process is carried out in a manner to permit re-utilization in the process of the raw materials not actually embodied in the sized vitrified granules. The process also insures thorough mixing of the ingredients and the accompanying ready duplication of results in succeeding runs both as to size and color.

The vitrified ceramic granules made in accordance with the process of the present invention have practically no water absorption, are resistant to erosion, and other weathering conditions, and are of uniform structure and coloration. The granules also do not bloom or blister, and since the same coloration is found interiorly as on the surface, any slight wearing of the surface of the granule, encountered after continued use, will not alter the appearance of the object to which the granules are applied. The vitrified ceramic granules obtained as the result of the process have rounded surfaces, and, therefore, are particularly applicable for use in surfacing asphalt- or bitumen-covered paper employed for roofing and similar purposes. In certain instances, previously, attempts to use sharp cornered or pointed granules for such products have not met with success, due to punctures formed in the coated paper by the granules when they are pressed into the surface rendered plastic by heat. With the rounded particles obtained as hereinafter described, no puncturing or cutting of the paper backing is encountered. In addition to the use of the granules with coated paper, they may be employed as desired as facing material for any number of structures, such as brick building blocks, concrete, stucco and materials of this general type. They may also be used in forming mosaics or in fish bowls, bowls holding bulbs and the like.

Since the process of the present invention involves the use of a series of steps, each of which contributes to the success of the process, it is illustrated by a flow sheet in the accompanying drawing.

The material forming the main ingredient of the mix from which the granules are formed may be any one of a variety of substances, possessing plasticity and capable of vitrification to form a ceramic upon subjection to heat, and may be a single compound or a mixture of compounds. Hereinafter this material will be termed "plastic vitrifiable ceramic material." The material employed in the process does not contain any appreciable amount of combustible material, and for this reason the granules obtained are dense and have practically no water absorption. The various clays, preferably those that are of high plasticity, are particularly applicable. A plastic mixture of a non-plastic vitrifiable material and a highly colloidal material, such as bentonite or ammonium alginate, may also be used and is included within the term "plastic vitrifiable ceramic material." For example, the addition of a small amount of these or other highly colloidal materials will give to non-plastic material such as feldspar, feldspathic materials, Cornwall stone, silicon dioxide and pyrophyllite, working qualities and plasticity very closely approaching those of a clay, thereby rendering them suitable for use in the process. The plastic vitrifiable ceramic material may be chosen to give the color desired in the finished product, or coloring matter may be added thereto in the necessary amounts to give the desired coloration, usually one-half per cent or less being sufficient. For example, red, buff and white granules may be obtained by choosing clays which upon vitrification will produce these colors. The granules may also be obtained in the desired color by intermixing inorganic coloring materials with the plastic vitrifiable ceramic material, for example, an oxide, or a compound which upon heating will produce an oxide, the oxide in either case after vitrification giving the desired color to the granules. If the compound forming the oxide is added in the form of a salt, it is preferable to add a basic substance to the ceramic mix to bring about precipitation of the hydroxide in the mix, thus avoiding loss of material in the filtration step of the process. It will be realized that the final color obtained is determined in part by the color of the plastic vitrifiable ceramic material after vitrification, for example, modified colors are obtained if the ceramic material is itself buff or red. If coloring material is to be added, cobalt oxide will produce blue or green granules, depending on the color of the vitrified ceramic material; chromium oxide—green or brown; uranium oxide—yellow; manganese oxide and iron oxide mixed—black, iron oxide—red, etc.

The process of the present invention contemplates forming the plastic vitrifiable ceramic material and added coloring matter if employed, into a cream or slurry with water preferably by blunging, removing sufficient water therefrom to form solid material, breaking the solid material into granules, preferably by a cutter, screening the granules to remove the fines and over-size particles therefrom, vitrifying the sized granules in a kiln or furnace such as a rotary kiln, and thereafter, if necessary, further screening the vitrified granules to sort them to the desired finished size.

The material removed by the screens preceding the vitrification step is returned to the process so that no loss of material is involved. The fine material is delivered to the mixing apparatus, for example, the blunger, and is mixed with the fresh supply of plastic vitrifiable ceramic material. The coarse particles may also be delivered to the blunger, but are advantageously returned to the apparatus employed to form the sized granules, for example, the cutter. The over-size granules obtained after screening the vitrified granules may be passed through rolls to reduce the size, and then passed with the granules from the vitrification step to the screens. The only loss of material, therefore, is the small amount of fine particles removed by the screens following the vitrification step, but due to the preliminary screening and the nature of the particles, the loss of material is negligible.

In the accompanying drawing, the process is illustrated by means of a flow sheet. The plastic vitrifiable ceramic material, the coloring matter if employed, and at least approximately fifty per cent of water are formed into a cream or slurry in the mixing chamber or blunger A. If clay is employed it may be added to the mixing chamber or blunger in lump form or in subdivided condition, reliance being had in the mechanical action to break down the material. With other types of substances it will be desirable to add them in subdivided form. If the plastic vitrifiable ceramic material contains appreciable quantities of foreign materials, such as silica, iron pyrites or lignite, it is advantageously passed through a lawn or screen to remove the course particles before the coloring matter is added, after which it is returned to the blunger and the cream or slurry is formed in the presence of the coloring matter. It may also be advantageous to insure distribution of the coloring material in the plastic vitrifiable ceramic material to mix it with a small portion of the plastic vitrifiable ceramic material, for example, in a ball mill. The mixture is then added to the blunger A which is of usual construction and contains a series of arms or paddles which are vigorously rotated to produce a slapping action on the vitrifiable ceramic material, thus breaking it down into the form of a slurry or cream in a relatively short time.

The slurry or cream from blunger A is then filtered to remove as much water therefrom as possible. The filter is shown in the drawing at B and may be of any available type, for example, a stationary plate filter or a rotary vacuum filter. With some types of plastic vitrifiable ceramic material, it may be desirable to heat the slurry or cream before filtration in order to thicken or coagulate the materials. As an alternative step, the heater is shown in the drawing in dotted lines at $A^1$, and the heat is advantageously supplied by the waste heat from the vitrification furnace, although any other source is obviously applicable.

In most instances, the filter cake will not be sufficiently dry for the cutting operation and is, therefore, delivered to a dryer C to remove additional water therefrom. Before the drying step, the material may, if desired, be extruded through a suitable press $B^1$ which compacts the clay and decreases the porosity. The dried material, preferably containing not more than 5% water, is placed in a breaker mill or cutter D which is revolved at a speed sufficient, depending on the characteristics of the particular vitrifiable ceramic material, to break down the lumps of material into gravel-like granules of the sizes desired. The material from the cutter D is then delivered to screens E to sort the granules into the various sizes. The granules which are too large for the particular use for which the granules are being manufactured may be returned to the cutter D and then broken down with the dried material. The fine particles, and the coarse particles if desired, are added to the blunger A and are thus re-used in the process.

The sized particles from screens E are delivered to a vitrification furnace F of any desired construction, for example, a rotary kiln, and sufficient heat is supplied to the furnace to cause burning or vitrification of the particles. The exact heat necessary will depend on the nature of the plastic vitrifiable ceramic material employed. The material may be then used or shipped for use, but in many instances it will be advisable to screen the vitrified granules in order to size them and to eliminate any fines that may have been formed. The screens are shown in the flow sheet at G—and any over-size particles may be passed through rolls and then re-screened with the granules delivered from the vitrification furnace. It may also in some instances be desirable to pass all the material through rolls, between the furnace and screens, in order to break down any adhesions between the granules brought about during the vitrification step.

In a typical case, 769 pounds of disintegrated clay and 50 gallons or approximately 416.5 pounds of water, i. e. approximately 53 per cent of water, are placed in a blunger. The blunging is continued for about four hours until the material is of the consistency of a heavy cream which weighs 3 pounds, 10¼ ounces per quart. The cream is passed over and through a 60-mesh lawn or screen to remove any coarse particles and the screened slurry is transferred to another blunger. Three gallons of the slurry is placed in a ball mill to which is added 2 pounds, 12 ounces of black oxide of cobalt. After grinding for one hour to insure thorough mixing of the coloring material and the clay, the entire contents of the ball mill are poured into the blunger containing the main portion of the mix. After thorough mixing for an additional four hours, the material is filtered and is then dried to reduce the moisture content to below 5%. The dried material is placed in a cutter and broken up into granules. The granules are then screened to obtain the granules of the desired sizes, for example, 8-mesh to 35-mesh. The fines are returned to the blunger for re-processing and the coarse particles are run through the cutter again. The sized granules are then placed in a suitable furnace or kiln and fired to a temperature sufficient to bring about vitrification thereof. The vitrified granules are again screened to remove any dust formed in the process and the vitrified ceramic granules are available for use.

A typical formula of a plastic mixture made of non-plastic material and a highly colloidal substance is as follows: 200 pounds of ground feldspar, 20 pounds of bentonite, 10 pounds of flint, 60 grams of chrome oxide and 5 ounces of clay—the clay being employed to avoid glassiness in the product. This mixture is then processed as described above in the manufacture of vitrified ceramic granules. Mixtures of this type, as previously pointed out, due to the presence of the colloidal material therein, possess the necessary plasticity for satisfactory processing and also are characterized by the necessary toughness upon drying to permit granulation to size in the breaker mill or cutter.

Considerable modification is possible in the type of vitrifiable ceramic material employed and in the physical conditions maintained in the steps of the process without departing from the essential features of the invention.

I claim:

1. The process of producing dense vitrified ceramic granules of uniform density and coloring throughout which comprises blunging a mixture of plastic vitrifiable ceramic material and inorganic coloring material in the absence of combustible material together with at least approximately fifty percent of water to form a slurry, filtering said slurry, drying the filter cake obtained, mechanically breaking the dried colored material into gravel-like granules, and subjecting the granules to heat sufficient to form vitrified granules of substantially the same shape and size.

2. The process of producing dense vitrified ceramic granules of uniform density and coloring throughout which comprises blunging a mixture of plastic vitrifiable ceramic material and inorganic coloring matter in the absence of combustible material together with at least approximately fifty percent of water to form a slurry, filtering said slurry, drying the filter cake obtained, mechanically breaking the dried colored material into gravel-like granules, screening said granules to obtain the sizes desired, and subjecting the sized granules to heat sufficient to form vitrified granules of substantially the same shape and size.

3. The process of producing dense vitrified ceramic granules of uniform density and coloring throughout which comprises blunging a mixture of plastic vitrifiable ceramic material and inorganic coloring material in the absence of combustible material together with at least approximately fifty percent of water to form a slurry, filtering said slurry, drying the filter cake obtained, mechanically breaking the dried colored material into gravel-like granules, screening said material into gravel-like granules, screening said material to obtain the sizes desired, reprocessing the fines and oversize material, and subjecting the sized granules to heat sufficient to form vitrified granules of substantially the same shape and size.

LESLIE BROWN.